(12) United States Patent
Gillum et al.

(10) Patent No.: US 12,303,037 B2
(45) Date of Patent: May 20, 2025

(54) SANITARY SEAT COVER APPARATUS

(71) Applicants: Karen Gillum, Superior, AZ (US);
Brandy Gillum, Superior, AZ (US)

(72) Inventors: Karen Gillum, Superior, AZ (US);
Brandy Gillum, Superior, AZ (US)

( * ) Notice: Subject to any disclaimer, the term of this patent is extended or adjusted under 35 U.S.C. 154(b) by 197 days.

(21) Appl. No.: 18/097,774

(22) Filed: Jan. 17, 2023

(65) Prior Publication Data

US 2024/0237832 A1    Jul. 18, 2024

(51) Int. Cl.
*A47C 31/11* (2006.01)
*B60N 2/60* (2006.01)

(52) U.S. Cl.
CPC ............ *A47C 31/11* (2013.01); *B60N 2/6036* (2013.01)

(58) Field of Classification Search
CPC .......... A47C 31/11; B60N 2/6036; B60N 2/60
USPC ............................................. 297/227, 228.12
See application file for complete search history.

(56) References Cited

U.S. PATENT DOCUMENTS

| | | | | |
|---|---|---|---|---|
| 1,882,169 A | * | 10/1932 | Wedler ................ | B60N 2/6054 297/228.12 |
| 5,133,097 A | * | 7/1992 | Pyles .................... | A61B 46/00 297/227 |
| 5,700,053 A | * | 12/1997 | Downing .............. | A47C 31/11 5/663 |
| 5,803,539 A | * | 9/1998 | Dewar ................. | B60N 2/6054 297/DIG. 6 |
| 5,868,463 A | * | 2/1999 | Mackenzie ........... | A47C 27/18 297/452.41 |
| 5,957,528 A | * | 9/1999 | Campbell ............. | B60N 2/6036 297/229 |
| 6,220,997 B1 | | 4/2001 | Kohl | |
| 6,345,866 B1 | * | 2/2002 | Jackson ............... | B60N 2/6054 297/229 |
| 6,390,550 B1 | * | 5/2002 | Paredes, Jr. ........... | A47C 9/00 297/423.31 |
| 7,000,984 B1 | * | 2/2006 | Ward .................... | A47C 31/113 297/229 |
| 7,066,535 B2 | * | 6/2006 | Moses .................. | B60R 22/00 297/229 |
| 7,246,851 B1 | * | 7/2007 | Phillips ................ | B60N 2/75 297/227 |
| 8,689,371 B2 | | 4/2014 | Pitmman | |
| 8,852,712 B1 | | 10/2014 | Diaz | |
| 2003/0122411 A1 | * | 7/2003 | Chambers ............ | A47C 31/11 297/228.13 |

(Continued)

FOREIGN PATENT DOCUMENTS

WO    WO2016175904    11/2016

*Primary Examiner* — David R Dunn
*Assistant Examiner* — Tania Abraham (57) ABSTRACT

A sanitary seat cover apparatus for covering public seats includes a back cover rests on a seat back outer surface of a seat back of a seat or bench. A plurality of back straps is coupled to the back cover and extends past a back cover left edge and a back cover right edge. The plurality of back straps has a plurality of back engagement members to secure the back cover to the seat back. A bottom cover rests on a seat bottom outer surface of a seat bottom of the seat or bench. A plurality of bottom straps is coupled to the bottom cover and extends past a bottom cover left edge and a bottom cover right edge. The plurality of bottom straps has a plurality of bottom engagement members to secure the bottom cover to the seat bottom.

5 Claims, 6 Drawing Sheets

(56) References Cited

U.S. PATENT DOCUMENTS

| | | |
|---|---|---|
| 2006/0105138 A1 | 5/2006 | Nichols |
| 2008/0122274 A1* | 5/2008 | Edwards ................ A47C 31/11 |
| | | 297/219.1 |
| 2013/0341979 A1* | 12/2013 | Girard .................... A47C 7/021 |
| | | 297/227 |
| 2016/0249745 A1* | 9/2016 | Marton ................ A47C 31/007 |
| | | 297/227 |
| 2019/0159603 A1 | 5/2019 | Triglia |
| 2019/0246807 A1* | 8/2019 | Hensley ............. A63B 21/4039 |
| 2021/0015270 A1* | 1/2021 | Gonzalez ............... A47C 27/14 |

\* cited by examiner

SANITARY SEAT COVER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to seat cover devices and more particularly pertains to a new seat cover device for covering public seats. The present invention includes separate covers for the seat back and seat bottom. Each cover includes a plurality of straps to engage the seat while maintaining full motion of the seat back if it reclines.

(2) Description of Related Art Including Information Disclosed Under 37 CFR 1.97 and 1.98

The prior art relates to seat cover devices. Known devices include various seat covers to wrap around different chairs and exercise equipment. These devices are typically a single piece and cover more of the seat than just the outer surface. Known devices lack separate pieces to cover only the outer surface of the seat back and seat bottom with individual straps for each piece.

BRIEF SUMMARY OF THE INVENTION

An embodiment of the disclosure meets the needs presented above by generally comprising a back cover having a back cover front side, a back cover back side, a back cover top edge, a back cover bottom edge, a back cover left edge, and a back cover right edge. The back cover is configured to rest on a seat back outer surface of a seat back of a seat or bench. A plurality of back straps is coupled to the back cover. The plurality of back straps extends past the back cover left edge and the back cover right edge. The plurality of back straps has a plurality of back engagement members to selectively engage behind the seat back and secure the back cover to the seat back. A bottom cover has a bottom cover front side, a bottom cover back side, a bottom cover back edge, a bottom cover front edge, a bottom cover left edge, and a bottom cover right edge. The bottom cover is configured to rest on a seat bottom outer surface of a seat bottom of the seat or bench. A plurality of bottom straps is coupled to the bottom cover. The plurality of bottom straps extends past the bottom cover left edge and the bottom cover right edge. The plurality of bottom straps has a plurality of bottom engagement members to selectively engage behind the seat bottom and secure the bottom cover to the seat bottom.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
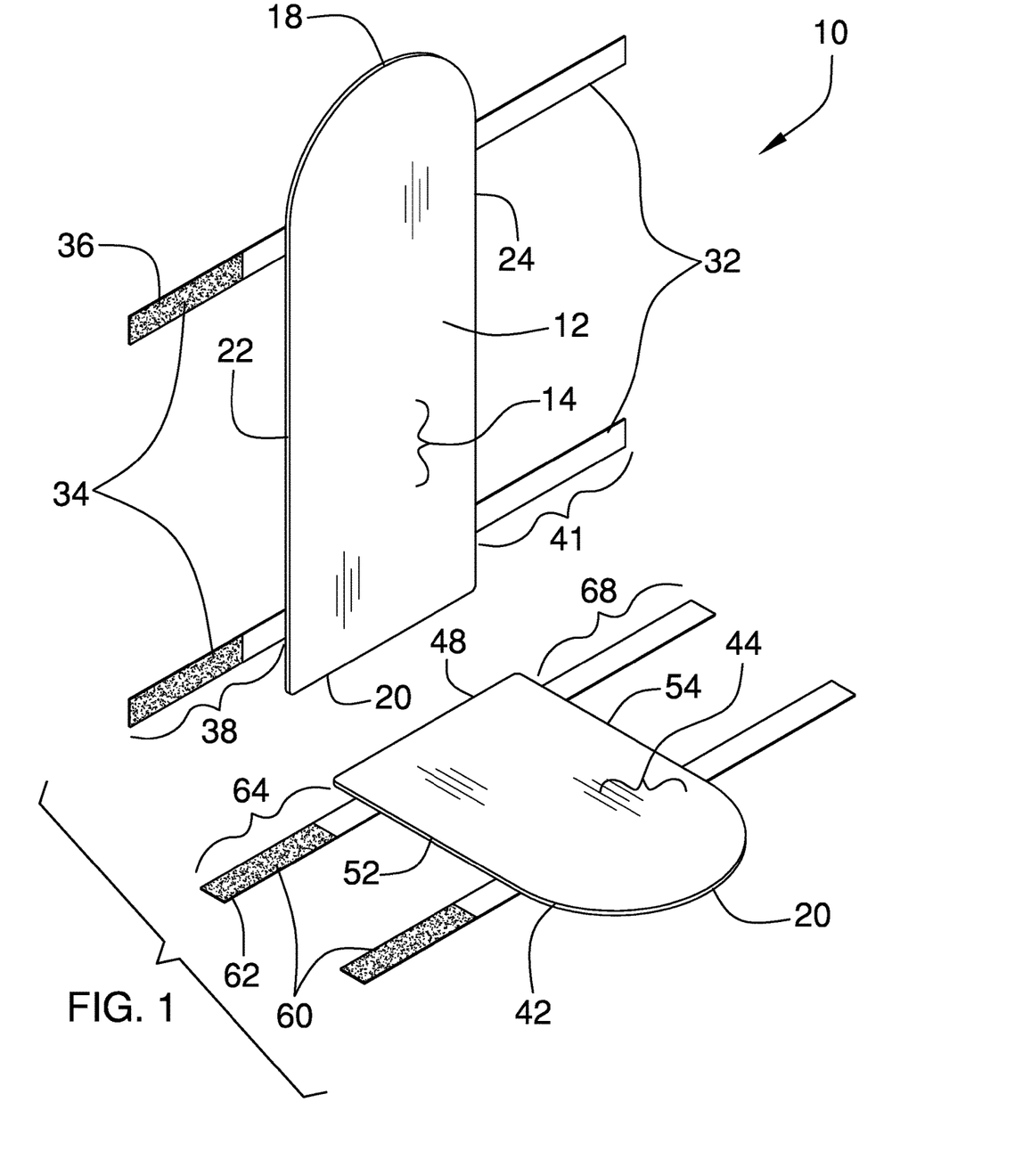
FIG. 1 is an isometric view of a sanitary seat cover apparatus according to an embodiment of the disclosure.
Figure 2:
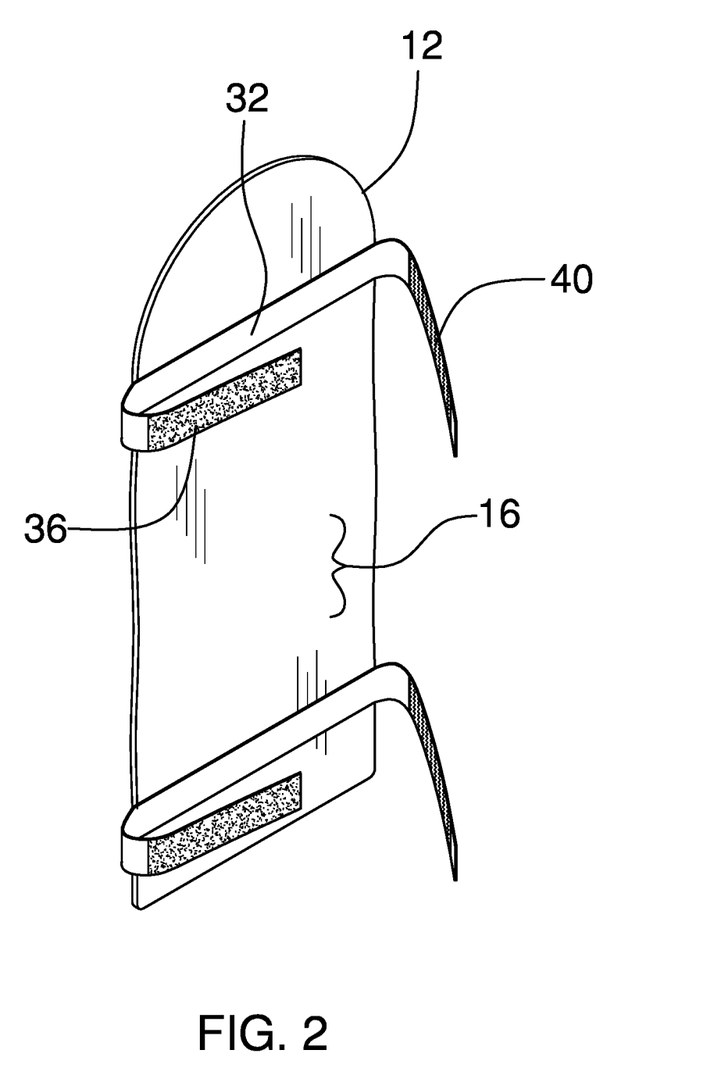
FIG. 2 is an isometric view of an embodiment of the disclosure.
Figure 3:
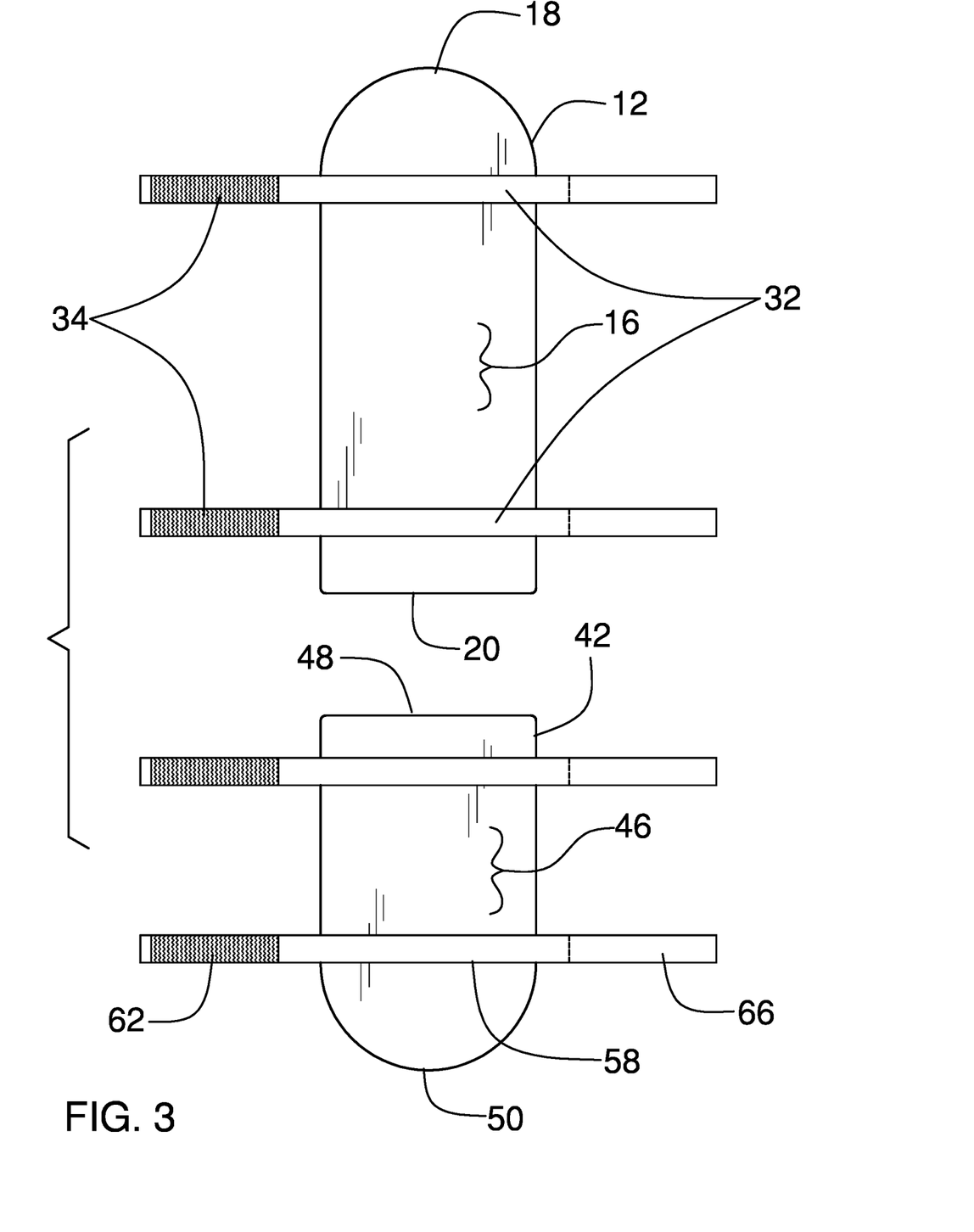
FIG. 3 is a bottom plan view of an embodiment of the disclosure.
Figure 4:
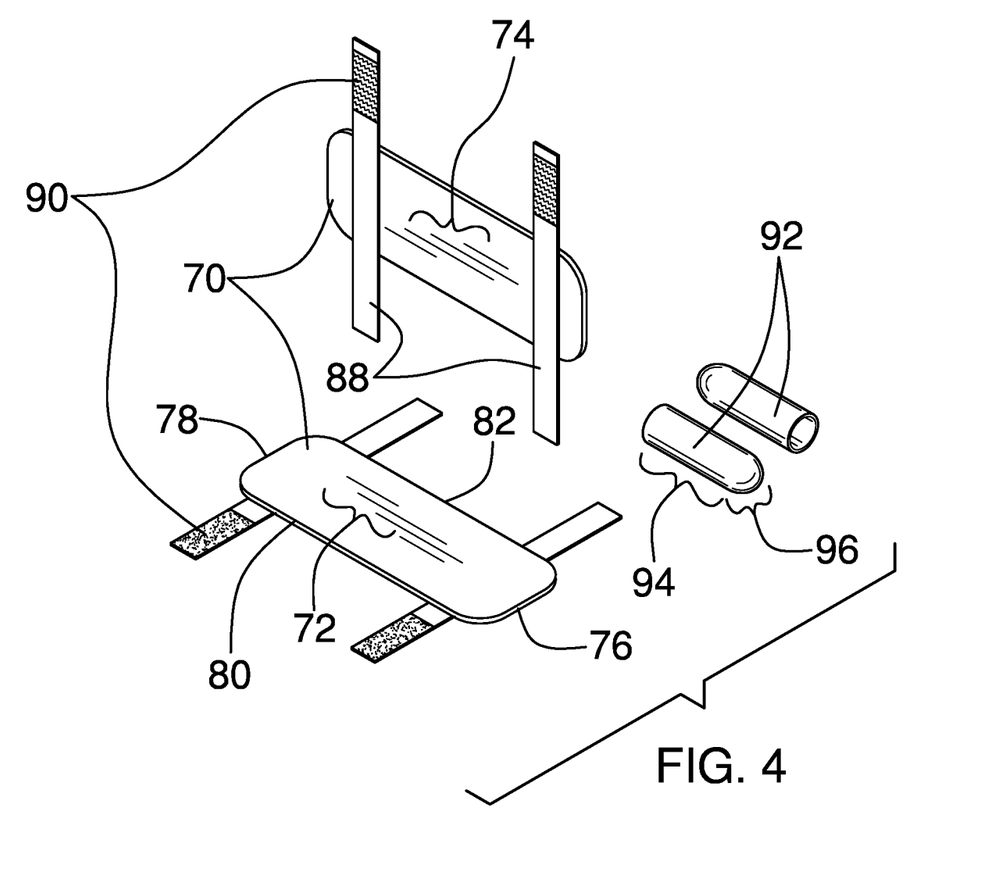
FIG. 4 is an isometric view of an embodiment of the disclosure.
Figure 5:
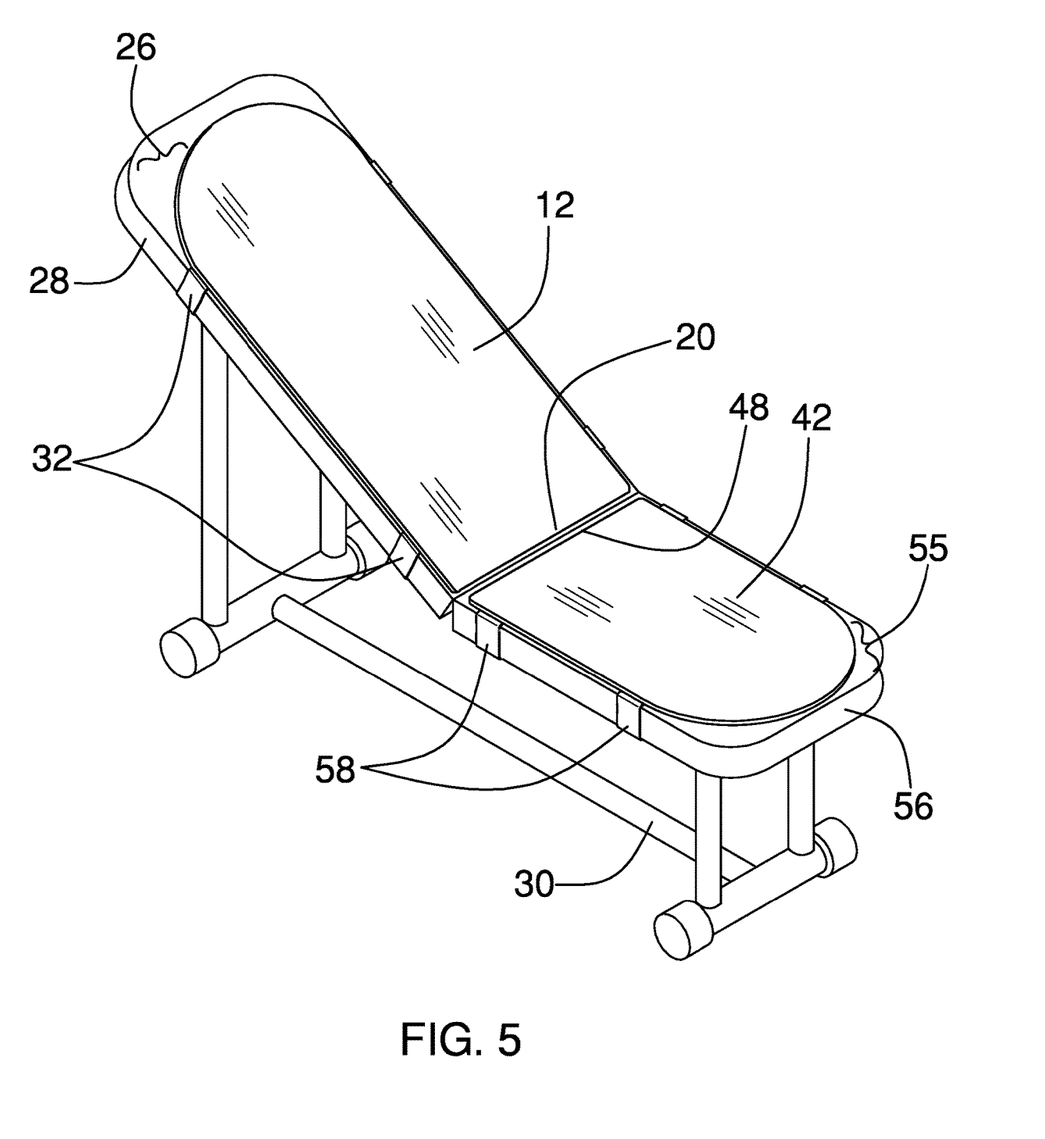
FIG. 5 is an isometric in-use view of an embodiment of the disclosure.
Figure 6:
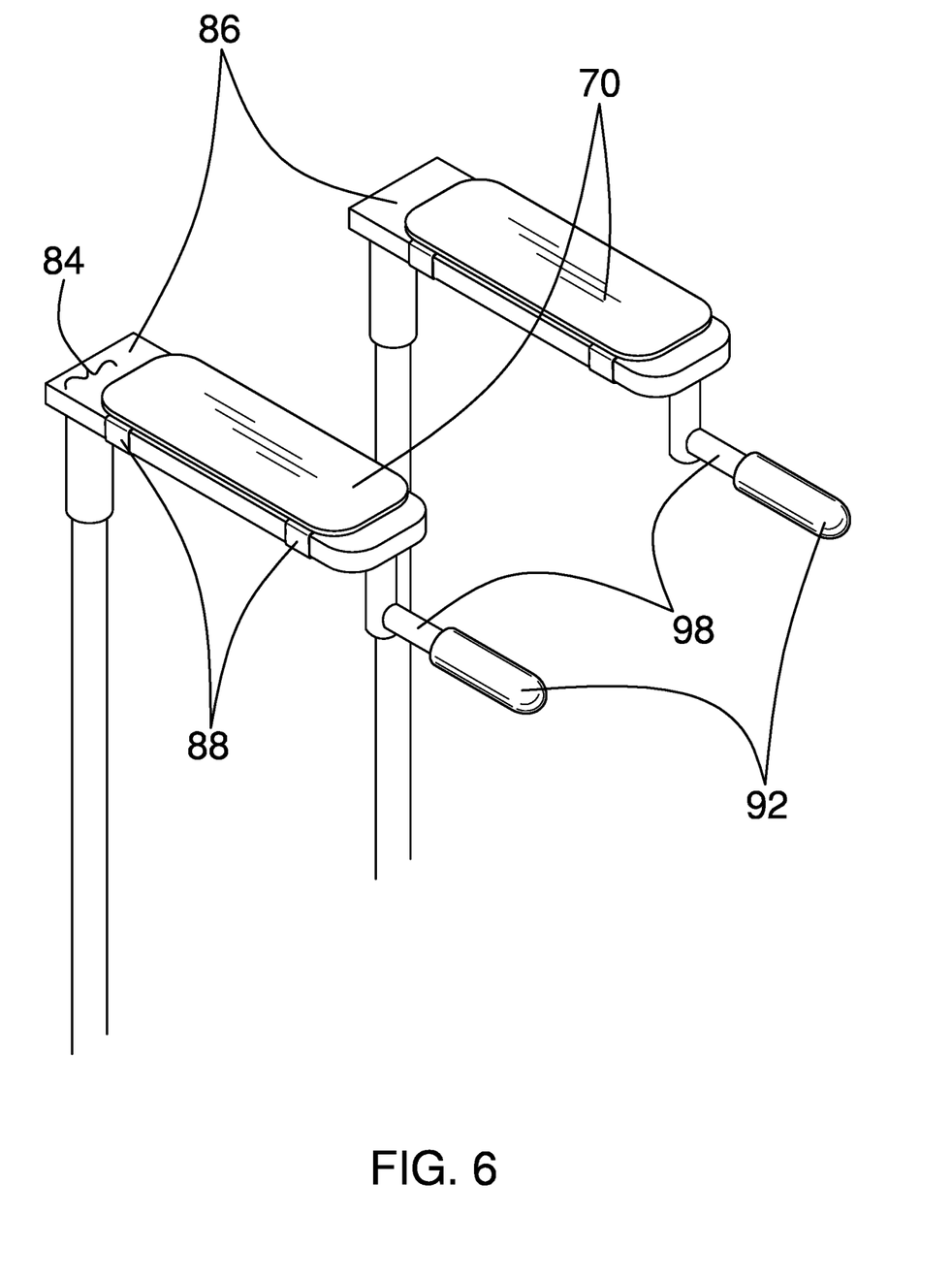
FIG. 6 is an isometric in-use view of an embodiment of the disclosure.

With reference now to the drawings, and in particular to FIGS. 1 through 6 thereof, a new seat cover device embodying the principles and concepts of an embodiment of the disclosure and generally designated by the reference numeral 10 will be described.

As best illustrated in FIGS. 1 through 6, the sanitary seat cover apparatus 10 generally comprises a back cover 12 having a back cover front side 14, a back cover back side 16, a back cover top edge 18, a back cover bottom edge 20, a back cover left edge 22, and a back cover right edge 24. The back cover 12 is configured to rest on a seat back outer surface 26 of a seat back 28 of a seat or bench 30. The back cover top edge 18 may be arcuate to conform to the shape of the seat or bench 30.

A plurality of back straps 32 is coupled to the back cover 12. The plurality of back straps 32 extends past the back cover left edge 22 and the back cover right edge 24. The plurality of back straps 32 has a plurality of back engagement members 34 to selectively engage behind the seat back 28 and secure the back cover 12 to the seat back 28. The plurality of back straps 32 may be a pair of back straps 32 coupled to the back cover back side 16 and perpendicularly extending past the back cover left edge 22 and the back cover right edge 24. Each of the back straps 32 may be continuously coupled to the back cover back side 16 from the back cover left edge 22 to the back cover right edge 24 to prevent undesired folding or lifting of the back cover 12 from the seat back 28.

The plurality of back engagement members 34 includes a first back engagement member 36 coupled to a left back strap portion 38 of each back strap and a second back engagement member 40 coupled to a right back strap portion 41 of each back strap. The first back engagement member 36 is selectively engageable with the second back engagement member 40.

A bottom cover 42 has a bottom cover front side 44, a bottom cover back side 46, a bottom cover back edge 48, a bottom cover front edge 50, a bottom cover left edge 52, and a bottom cover right edge 54. The bottom cover 42 is configured to rest on a seat bottom outer surface 55 of a seat bottom 56 of the seat or bench. The bottom cover front edge 50 may be arcuate to conform to the seat bottom 56. Each of the back cover 12 and the bottom cover 42 may be sufficiently foldable to be configured to be placed in a backpack or gym bag. The back cover 12 and the bottom cover 42 remain independent to allow for adjustment of the seat back 28 of the seat or bench independently of the seat bottom 56 as well as to accommodate a gap between the seat back 28 and the seat bottom 56.

A plurality of bottom straps 58 is coupled to the bottom cover 42. The plurality of bottom straps 58 extends past the bottom cover left edge 52 and the bottom cover right edge 54. The plurality of bottom straps 58 has a plurality of bottom engagement members 60 to selectively engage behind the seat bottom 56 and secure the bottom cover 42 to the seat bottom 56. The plurality of bottom straps 58 may be a pair of bottom straps 58 coupled to the bottom cover back side 46 and perpendicularly extending past the bottom cover left edge 52 and the bottom cover right edge 54. Each of the bottom straps 58 may be continuously coupled to the bottom cover back side 46 from the bottom cover left edge 52 to the bottom cover right edge 54 to prevent undesired folding or lifting of the bottom cover 42 from the seat bottom 56.

The plurality of bottom engagement members 60 includes a first bottom engagement member 62 coupled to a left bottom strap portion 64 of each bottom strap and a second bottom engagement member 66 coupled to a right bottom strap portion 68 of each bottom strap. The first bottom engagement member 62 is selectively engageable with the second bottom engagement member 66. Each of the first back engagement members 36, the second back engagement members 40, the first bottom engagement members 62, and the second bottom engagement members 66 may be selectively engageable fasteners such as, but not limited to, hook-and-loop, buttons, snaps, buckles, and the like.

There may be a pair of arm rest covers 70 each having a rest cover top side 72, a rest cover bottom side 74, a rest cover front edge 76, a rest cover back edge 78, a rest cover left edge 80, and a rest cover right edge 82. The rest cover 70 is configured to rest on an arm rest outer surface 84 of an arm rest 86 of the seat or bench. A plurality of rest straps 88 is coupled to the arm rest cover 70. The plurality of rest straps 88 extends past the arm rest cover left edge 80 and the arm rest cover right edge 82. The plurality of rest straps 88 has a plurality of rest engagement members 90 to selectively engage behind the arm rest 86 and secure the arm rest cover 70 to the arm rest 86.

There may be a pair of handle covers 92 each having a cylindrical handle body 94 and a handle end cap 96 coupled to the handle body 94. The handle body 94 is configured to slidingly engage a seat handle 98 of the seat or bench. The handle end cap 96 may be hemispherical.

In use, the back cover 12 is placed on the seat back 28. The plurality of back straps 32 is engaged around the seat back 28 with the plurality of back engagement members 34. The bottom cover 42 is then placed on the seat bottom 56. The plurality of bottom straps 58 is engaged around the seat bottom 56 with the plurality of bottom engagement members 60. If present, the pair of arm rest covers 70 is engaged around the arms rests 86 with the plurality of rest straps 88 or the pair of handle covers 92 is engaged with the seat handles 98.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:
1. A sanitary seat cover apparatus comprising:
a back cover having a back cover front side, a back cover back side, a back cover top edge, a back cover bottom edge, a back cover left edge, and a back cover right edge, the back cover being configured to rest on a seat back outer surface of a seat back of a seat or bench;
a plurality of back straps coupled to the back cover, the plurality of back straps extending past the back cover left edge and the back cover right edge, the plurality of back straps having a plurality of back engagement members to selectively engage behind the seat back and secure the back cover to the seat back;
a bottom cover having a bottom cover front side, a bottom cover back side, a bottom cover back edge, a bottom cover front edge, a bottom cover left edge, and a bottom cover right edge, the bottom cover being configured to rest on a seat bottom outer surface of a seat bottom of the seat or bench; and
a plurality of bottom straps coupled to the bottom cover, the plurality of bottom straps extending past the bottom cover left edge and the bottom cover right edge, the plurality of bottom straps having a plurality of bottom engagement members to selectively engage behind the seat bottom and secure the bottom cover to the seat bottom;
the back cover top edge being arcuate and the bottom cover front edge being arcuate;

the plurality of back straps being a pair of back straps coupled to the back cover back side and perpendicularly extending past the back cover left edge and the back cover right edge; the plurality of bottom straps being a pair of bottom straps coupled to the bottom cover back side and perpendicularly extending past the bottom cover left edge and the bottom cover right edge; each of the back straps being continuously coupled to the back cover back side from the back cover left edge to the back cover right edge; each of the bottom straps being continuously coupled to the bottom cover back side from the bottom cover left edge to the bottom cover right edge;

a pair of arm rest covers, each arm rest cover having a rest cover top side, a rest cover bottom side, a rest cover front edge, a rest cover back edge, a rest cover left edge, and a rest cover right edge, the arm rest cover being configured to rest on an arm rest outer surface of an arm rest of the seat or bench; and a plurality of rest straps coupled to the arm rest cover, the plurality of rest straps extending past the arm rest cover left edge and the arm rest cover right edge, the plurality of rest straps having a plurality of rest engagement members to selectively engage behind the arm rest and secure the arm rest cover to the arm rest; and a pair of handle covers, each handle cover having a cylindrical handle body and a handle end cap coupled to the handle body, the handle body being configured to slidingly engage a seat handle of the seat or bench.

2. The sanitary seat cover apparatus of claim 1 further comprising each of the back cover and the bottom cover being sufficiently foldable to be configured to be placed in a backpack or gym bag.

3. The sanitary seat cover apparatus of claim 1 further comprising the plurality of back engagement members including a first back engagement member coupled to a left back strap portion of each back strap and a second back engagement member coupled to a right back strap portion of each back strap, the first back engagement member being selectively engageable with the second back engagement member; the plurality of bottom engagement members including a first bottom engagement member coupled to a left bottom strap portion of each bottom strap and a second bottom engagement member coupled to a right bottom strap portion of each bottom strap, the first bottom engagement member being selectively engageable with the second bottom engagement member.

4. The sanitary seat cover apparatus of claim 1 further comprising the handle end cap being hemispherical.

5. A sanitary seat cover apparatus comprising:
a back cover having a back cover front side, a back cover back side, a back cover top edge, a back cover bottom edge, a back cover left edge, and a back cover right edge, the back cover being configured to rest on a seat back outer surface of a seat back of a seat or bench;
a plurality of back straps coupled to the back cover, the plurality of back straps extending past the back cover left edge and the back cover right edge, the plurality of back straps having a plurality of back engagement members to selectively engage behind the seat back and secure the back cover to the seat back, the plurality of back straps being a pair of back straps coupled to the back cover back side and perpendicularly extending past the back cover left edge and the back cover right edge, each of the back straps being continuously coupled to the back cover back side from the back cover left edge to the back cover right edge, the plurality of back engagement members including a first back engagement member coupled to a left back strap portion of each back strap and a second back engagement member coupled to a right back strap portion of each back strap, the first back engagement member being selectively engageable with the second back engagement member;

a bottom cover having a bottom cover front side, a bottom cover back side, a bottom cover back edge, a bottom cover front edge, a bottom cover left edge, and a bottom cover right edge, the bottom cover being configured to rest on a seat bottom outer surface of a seat bottom of the seat or bench, the back cover top edge being arcuate and the bottom cover front edge being arcuate, each of the back cover and the bottom cover being sufficiently foldable to be configured to be placed in a backpack or gym bag; and a plurality of bottom straps coupled to the bottom cover, the plurality of bottom straps extending past the bottom cover left edge and the bottom cover right edge, the plurality of bottom straps having a plurality of bottom engagement members to selectively engage behind the seat bottom and secure the bottom cover to the seat bottom, the plurality of bottom straps being a pair of bottom straps coupled to the bottom cover back side and perpendicularly extending past the bottom cover left edge and the bottom cover right edge, each of the bottom straps being continuously coupled to the bottom cover back side from the bottom cover left edge to the bottom cover right edge, the plurality of bottom engagement members including a first bottom engagement member coupled to a left bottom strap portion of each bottom strap and a second bottom engagement member coupled to a right bottom strap portion of each bottom strap, the first bottom engagement member being selectively engageable with the second bottom engagement member;

a pair of arm rest covers, each arm rest cover having a rest cover top side, a rest cover bottom side, a rest cover front edge, a rest cover back edge, a rest cover left edge, and a rest cover right edge, the arm rest cover being configured to rest on an arm rest outer surface of an arm rest of the seat or bench;

a plurality of rest straps coupled to the arm rest cover, the plurality of rest straps extending past the arm rest cover left edge and the arm rest cover right edge, the plurality of rest straps having a plurality of rest engagement members to selectively engage behind the arm rest and secure the arm rest cover to the arm rest; and a pair of handle covers, each handle cover having a cylindrical handle body and a handle end cap coupled to the handle body, the handle body being configured to slidingly engage a seat handle of the seat or bench, the handle end cap being hemispherical.

* * * * *